UNITED STATES PATENT OFFICE.

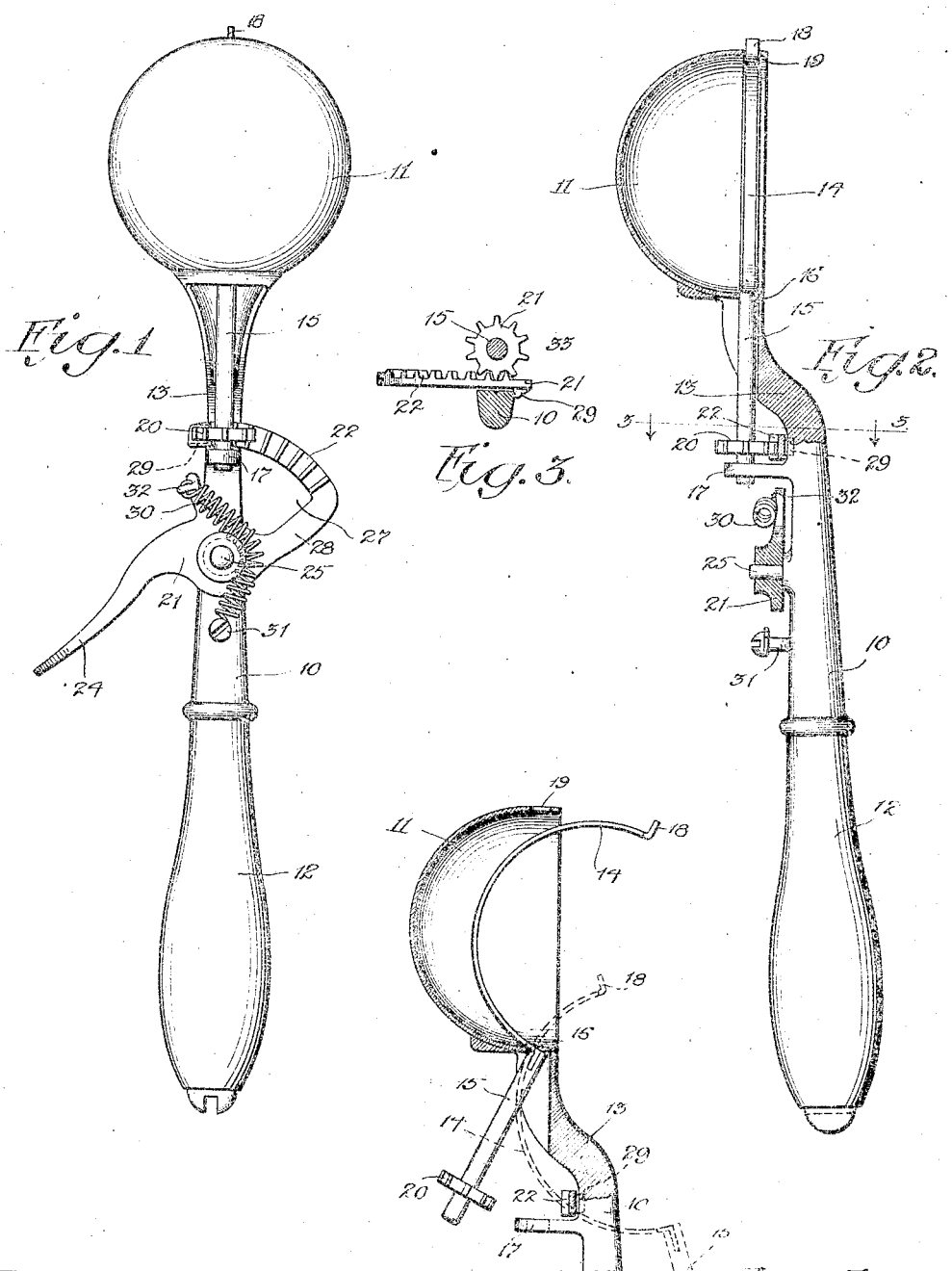

RAYMOND B. GILCHRIST, OF NEWARK, NEW JERSEY, ASSIGNOR TO THE GILCHRIST COMPANY, OF NEWARK, NEW JERSEY, A CORPORATION.

ICE-CREAM LADLE.

1,109,578.   Specification of Letters Patent.   Patented Sept. 1, 1914.

Application filed June 22, 1911.   Serial No. 634,752.

*To all whom it may concern:*

Be it known that I, RAYMOND B. GILCHRIST, a resident of Newark, in the county of Essex and State of New Jersey, have invented certain new and useful Improvements in Ice-Cream Ladles, of which the following is a full, clear, and exact description.

The invention relates to ice-cream dishers or ladles, and designs to provide a simple device in which provision is made for the removal of the scraper for cutting the cream from the bowl and other operating parts, to facilitate cleaning or washing thereof.

The invention consists in the several novel features hereinafter set forth and more particularly defined by claims at the conclusion hereof.

In the drawings, Figure 1 is an inverted plan of a device embodying the invention. Fig. 2 is a side elevation, parts being shown in section. Fig. 3 is a detail section taken on line 3—3 of Fig. 2. Fig. 4 is a section, showing the manner of removing the scraper from the bowl.

A frame or handle 10 has a bowl 11 secured to one end thereof and a grip 12 to the other end thereof. The frame is offset as at 13. A scraper 14, formed of a narrow resilient strip, is adapted to sweep around the bowl to sever the ice-cream therefrom and is secured to a shaft or spindle 15 which is journaled in a closed bearing 16 at one side of the bowl and adjacent the handle and in a lug 17 integrally formed with the handle or frame 10. Since the scraper is to be withdrawn through the closed bearing 16, its width is restricted to the diameter of the bearing which usually will be about that of spindle 15, practically. The outer end of scraper 14 is provided with a trunnion or terminal 18 which is held in a bearing 19 at the outer end of the bowl.

A pinion 20 is rigid on shaft 15 and a lever 21 is provided with an arcuate rack 22 at one end thereof which is adapted to engage with and operate the pinion 20 to rotate shaft 15 and scraper 14, and the lever is also provided with a laterally and rearwardly extending finger-piece 24, whereby the lever may be operated toward the frame or handle by the thumb of the operator. The lever is pivotally and movably mounted upon a stud 25 which is rigid on handle 10. Said lever is provided with an opening 27 through which lug 17 extends so that the inner end of the shaft 15 will have a bearing adjacent the rack and the pinion 20, and the latter will be disposed between bearings 16 and 17. Arm 28 of lever 21 is adapted to abut against one side of bearing 17 to limit the movement of the lever, when it is shifted to operate the scraper in the bowl. A stop 29 limits the movement of the lever in the spring-pressed direction. A coil spring 30 has one end connected to a screw 31, on the handle and has its other end hooked into a lug on the lever. This spring serves to operate the lever and scraper in one direction and is detachably connected at 32 and 31 to permit the lever to be removed.

To remove the scraper from the bowl it is only necessary to release and withdraw trunnion 18 from bearing 19 then slide shaft 15 out from and out of bearing 17, and then to incline the scraper and shaft as indicated in Fig. 4, and at the same time the shaft may be swung laterally to clear the lever handle, so the scraper can be withdrawn through the closed bearing 16. The scraper and shaft may thus be removed without disturbing the operating-lever and the shaft is thus removably held in two closed bearings so that it will be truly mounted on the frame. When the scraper and shaft have been removed, the lever 21 will be free to be removed from its pivot 25. When spring 30 is disconnected from stud 31 or lug 32 the lever can be removed from its pivot 25. In assembling, spring 30 may be put under tension by the lever when the lever is separated sufficiently from the frame, to permit stop-lug 29 to slip over the frame, and then pressing the lever toward the frame, to render said lug operative to arrest the lever. By separation of the lever from the frame lug 29 will be rendered inoperative to hold the lever, and thus the tension on the spring may be released for convenience in separating the parts. The spring also serves to hold the lever on its pivot and the pinion 20 serves a similar purpose when it is in operative relation to the rack on the lever.

The invention is not to be understood as restricted to the details set forth since these may be modified by the skilled mechanic within the scope of the appended claims without departing from the spirit and scope of the invention.

Having thus described the invention what I claim as new and desire to secure by Letters Patent is:

1. In an ice-cream disher the combination of a handle, a bowl on the handle, a narrow scraper for the bowl, a bearing for the inner end of the scraper, a spindle as thick, at least, as the scraper is wide secured to the scraper, a bearing on the handle for the outer end of said spindle, a closed bearing for the spindle adjacent the scraper, a lever pivoted to the handle, and lever operated means on the spindle for rotating the spindle, and disposed between the two spindle bearings, the scraper being removable through the bearing adjacent the scraper and the spindle being removable from its bearings.

2. In an ice-cream disher, the combination of a handle, a bowl on the handle, a narrow scraper for the bowl, a trunnion on the scraper, a bearing at one side of the bowl for said trunnion, a spindle secured to the scraper, a bearing on the handle for the outer end of said spindle, a closed bearing at least as wide as the scraper for the spindle adjacent the scraper, a lever pivoted to the handle, and lever operated means on the spindle for rotating the spindle and disposed between the two spindle bearings, the scraper being removable through the bearing adjacent the scraper from its bearings.

3. In an ice-cream disher, the combination of a handle, a bowl on the handle, a narrow scraper for the bowl, a spindle secured to the scraper, a bearing on the handle for the outer end of said spindle, a closed bearing at least as wide as the scraper for the spindle adjacent the scraper, a lever pivoted to the handle, a pinion on the spindle and operated by the lever and disposed between the two spindle bearings, the scraper being removable through said closed bearing and the spindle being removable from the bearings.

4. An ice cream disher comprising the combination of a handle, a bowl on the handle, a scraper for the bowl, a spindle secured to the scraper, a lever pivoted to the handle, a pinion on the spindle, operated by the lever and for rotating the spindle, and a closed bearing in the bowl for said spindle, said scraper being formed so it can be withdrawn from the bowl through said closed bearing.

5. In an ice-cream disher the combination of a handle, a bowl on the handle, a scraper for the bowl, a trunnion on the scraper, a bearing in the bowl for said trunnion, a spindle secured to the scraper, a lever pivoted to the handle, and having an opening therein, means on the spindle operated by the lever for rotating the spindle and scraper, and a bearing for the spindle extending through the opening in the lever, said scraper and spindle being removable from said bearings.

6. In an ice-cream disher the combination of a handle, a bowl on the handle, a scraper for the bowl, a trunnion on the scraper, a bearing in the bowl for said trunnion, a spindle secured to the scraper, a lever pivoted to the handle and provided with a rack, a pinion on the spindle, operated by the rack and for rotating the spindle and scraper, and a bearing for the spindle disposed between the lever-pivot and the rack, said spindle being removably held in said bearing.

7. In an ice-cream disher, the combination of a handle, a bowl on the handle, a scraper for the bowl, a spindle secured to the scraper, a lever pivoted to the handle and provided with a rack, a pinion on the spindle operated by the rack for rotating the spindle and scraper, and a bearing for the spindle disposed between the lever-pivot and the rack, said spindle being removably held in said bearing.

8. In an ice-cream disher the combination of a handle, a bowl on the handle, a scraper for the bowl, a spindle secured to the scraper, a lever pivoted to the handle and having an opening therein, means on the spindle, engaged by the lever and for rotating the spindle and scraper, and a bearing on the handle, for the spindle, and extending through said opening in the lever, said spindle being removably held in said bearing.

9. In an ice-cream disher, the combination of a handle, a bowl on the handle, a scraper for the bowl, a spindle secured to the scraper, a lever pivoted to the handle and having an opening therein, a pinion on the spindle, a rack on the lever for operating the pinion to rotate the spindle and scraper, a bearing on the handle, extending through the opening in the lever and in which the spindle is removably held.

RAYMOND B. GILCHRIST.

Witnesses:
FRED GERLACH,
FRANK W. BERM..